United States Patent
Crane et al.

(10) Patent No.: US 9,611,696 B2
(45) Date of Patent: Apr. 4, 2017

(54) DIRECTIONAL DRILL HAMMER PULLBACK DEVICE

(71) Applicant: Earth Tool Company LLC, Oconomowoc, WI (US)

(72) Inventors: Robert F. Crane, Oconomowoc, WI (US); Jon Scharrer, Johnson Creek, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 0 days.

(21) Appl. No.: 14/865,416

(22) Filed: Sep. 25, 2015

(65) Prior Publication Data
US 2016/0010394 A1 Jan. 14, 2016

Related U.S. Application Data

(63) Continuation of application No. 14/197,865, filed on Mar. 5, 2014, now Pat. No. 9,169,946.

(60) Provisional application No. 61/774,678, filed on Mar. 8, 2013.

(51) Int. Cl.
| | |
|---|---|
| *F16L 1/024* | (2006.01) |
| *E21B 10/00* | (2006.01) |
| *F16L 1/028* | (2006.01) |
| *F16L 1/032* | (2006.01) |
| *F16L 55/165* | (2006.01) |
| *E21B 7/06* | (2006.01) |

(52) U.S. Cl.
CPC .............. *E21B 10/00* (2013.01); *E21B 7/064* (2013.01); *F16L 1/028* (2013.01); *F16L 1/032* (2013.01); *F16L 55/1658* (2013.01); *Y10T 29/49826* (2015.01); *Y10T 29/49947* (2015.01)

(58) Field of Classification Search
CPC . E21B 7/046; E21B 7/064; E21B 7/20; E21B 7/28; E21B 10/00; E21B 10/38; E21B 10/56; E21B 10/62; F16L 1/028; F16L 1/032; F16L 55/1657; F16L 55/18
See application file for complete search history.

(56) References Cited

U.S. PATENT DOCUMENTS

| | | | |
|---|---|---|---|
| 4,296,823 A | 10/1981 | Gholson | |
| 5,651,639 A | 7/1997 | Wentworth et al. | |
| 5,687,805 A | 11/1997 | Perry | |
| (Continued) | | | |

*Primary Examiner* — John Kreck
*Assistant Examiner* — Carib Oquendo
(74) *Attorney, Agent, or Firm* — Tomlinson McKinstry, P.C.

(57) ABSTRACT

A pullback system to install or replace underground utilities that is used with a hammer used in horizontal directional drilling operations. The system comprises a drill bit attached to the hammer. The drill bit comprises a cutting face comprising a first and second passage. The system further comprises a pullback adapter comprising an attachment member, a first member, and a second member. The attachment member may be secured to the cutting face of the drill bit by inserting the first member of the pullback adapter through the first passage of the cutting face and inserting the second member of the pullback adapter through the second passage of the cutting face. The first member secures to the second member within an internal cavity of the drill bit to hold the attachment member for movement with the drill bit. A new pipe may be secured to a shackle on the pullback adapter. The drilling machine will then pull the hammer rearwardly through the borehole which in turn pulls the new pipe into the borehole.

20 Claims, 8 Drawing Sheets

(56) References Cited

U.S. PATENT DOCUMENTS

| | | |
|---|---|---|
| 8,122,979 B1 | 2/2012 | Wright et al. |
| 8,544,569 B2 | 10/2013 | Wright et al. |
| 2002/0011355 A1 | 1/2002 | Wentworth et al. |
| 2002/0112890 A1 | 8/2002 | Wentworth et al. |
| 2004/0226750 A1 | 11/2004 | Tjader |
| 2005/0034897 A1 | 2/2005 | Youan |
| 2009/0250266 A1 | 10/2009 | Dimitroff |
| 2012/0018221 A1 | 1/2012 | Crane |
| 2012/0043132 A1 | 2/2012 | Crane |

DIRECTIONAL DRILL HAMMER PULLBACK DEVICE

CROSS REFERENCE TO RELATED APPLICATION

This application is a continuation of U.S. patent application Ser. No. 14/197,865, filed Mar. 5, 2014, which claims the benefit of U.S. Provisional Patent Application Ser. No. 61/774,678, filed on Mar. 8, 2013, the entire contents of which are incorporated herein by reference.

FIELD

The present invention relates generally to earth boring drill bits, and in particular to drill bits used with hammers during horizontal directional drilling operations to install or replace underground utilities.

SUMMARY

The present invention is directed to a pullback adapter for use with a hammer used in horizontal directional drilling operations. The hammer comprises a drill bit comprising a cutting face, an internal cavity, a first passage, and a second passage. The pullback adapter comprises an attachment member, a first member, and a second member. The first member is connected to the attachment member and disposed in the first passage and the internal cavity. The second member is connected to the attachment member and disposed in the second passage and the internal cavity. The second member is also connected to the first member within the internal cavity to hold the attachment member for movement with the drill bit.

The present invention is also directed to a drill bit comprising a body having an internal cavity, a cutting face, a first passage, a second passage, and a pullback adapter. The first passage extends from the internal cavity to the cutting face and comprises a first opening on the cutting face. The second passage extends from the internal cavity to the cutting face and comprises a second opening on the cutting face. The pullback adapter comprises a frame, a first leg, and a second leg. The first leg extends from the frame into the first opening through the first passage and into the internal cavity. The second leg extends from the frame into the second opening through the second passage and into the internal cavity. The second leg is connected to the first leg within the cavity to secure the frame relative to the cutting face.

The present invention is further directed to a pullback system used in horizontal directional drilling operations. The system comprises a hammer, a drill bit, and a pullback adapter. The drill bit comprises a cutting face, an internal cavity, a first passage, and a second passage. The first passage extends through the cutting face and into the internal cavity, and the second passage extends through the cutting face and into the internal cavity. The pullback adapter comprises an attachment member, a first member, and a second member. The first member is connected to the attachment member and extends through the first passage and into the internal cavity. The second member is connected to the attachment member and extends through the second passage and into the internal cavity and is connected to the first member within the internal cavity to hold the attachment member for movement with the cutting face.

The present invention is additionally directed to a method for connecting a pullback adapter to a drill bit comprising a first passage and a second passage, wherein the passages extend through the cutting face of the drill bit to an internal cavity in the drill bit. The method comprises the steps of inserting a first member through the first passage and into the internal cavity, inserting a second member through the second passage and into the internal cavity, and connecting the first member to the second member within the internal cavity to secure an attachment member to the drill bit.

The present invention is finally directed to a method for installing a new pipe underground. The method comprises the steps of drilling a borehole using a downhole tool connected to a drill string until the downhole tool reaches an underground target point, exposing a drill bit connected to the downhole tool at the target point, and connecting a pullback adapter to the drill bit. The pullback adapter is connected to the drill bit by inserting a first member of the pullback adapter through a first passage formed in the drill bit and into an internal cavity, inserting a second member of the pullback adapter through a second passage formed in the drill bit and into the internal cavity, and connecting the first member to the second member within the internal cavity such that an attachment member is held in place relative to the cutting face of the drill bit. The method for installing the new pipe further comprises the steps of connecting the new pipe to the attachment member, and pulling the downhole tool, the drill bit, and the drill string rearwardly such that the new pipe is pulled into the borehole.

DESCRIPTION

Horizontal directional drills or boring machines may be used to replace or install underground utilities with minimal surface disruption. The machines utilize a series of drilling pipes joined end to end, at an entry access point, to form a drill string. The drill string may be attached to a downhole tool which bores underground forming a borehole and pulling the drill string behind it. One variation on this traditional boring system is to use the drill string in combination with a percussive tool or a pneumatic hammer. The hammer may also be fluid driven. The hammer imparts repeated strikes against a face of the borehole to create an underground borepath. The hammer is effective when drilling in rocky soil or solid rock. The hammer is also capable of steering underground to reach a desired target point. Steering may be accomplished by using an asymmetrical drill bit or a bent housing having a deflection shoe. Once the hammer reaches the target point and the desired borepath has been formed, the hammer is typically excavated and a new pipe is attached to the drill string still remaining in the borehole. The boring machine, at the entry access point, may then remove the drill string from the borehole one section at a time. The removal of the drill string works to pull the new pipe rearwardly through the borehole from the target point until the new pipe extends the length of the borehole underground.

As the hammer is typically operated in rocky or even solid rock conditions, it is often a considerable amount of work, time, and expense to remove the hammer from the borehole at the target point. One alternative is to pull the hammer back through the borehole via the drill string and remove the hammer at the entry access point rather than the target point. The drill string is then pushed back through the borehole by the boring machine for attachment to the new pipe at the target point. However, it may not be possible or it may be too expensive to retrace the path of the bore using the drill string alone after the hammer is removed due to cave-ins at unstable points along the bore.

Figure 1:
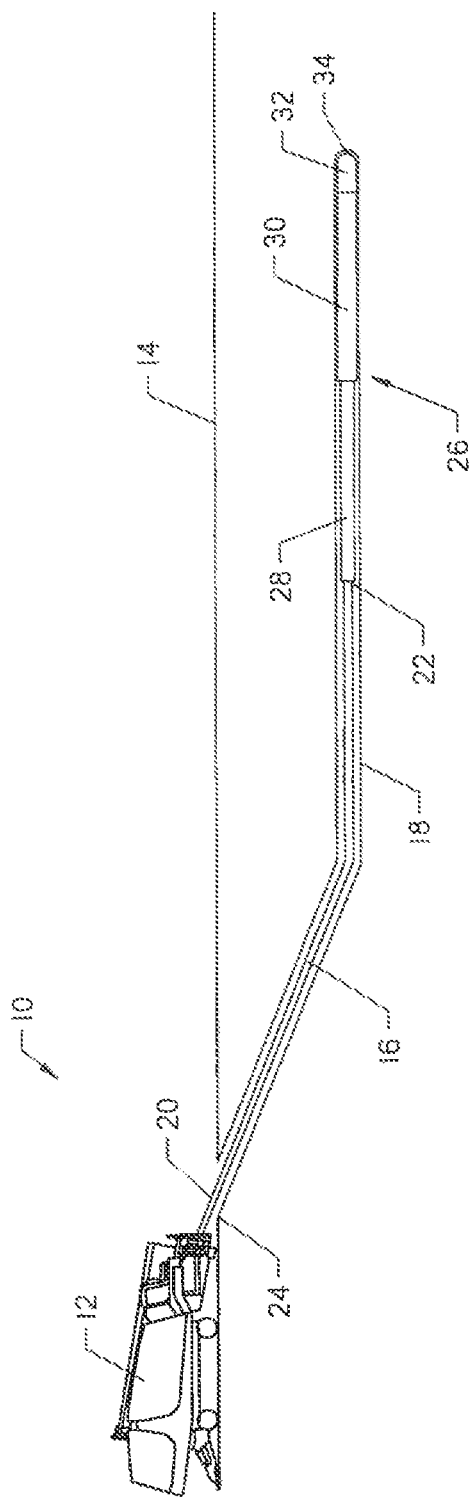
FIG. 1 is an illustration of a horizontal directional drilling system for drilling a horizontal borehole using a downhole tool comprising a hammer.
Figure 8:
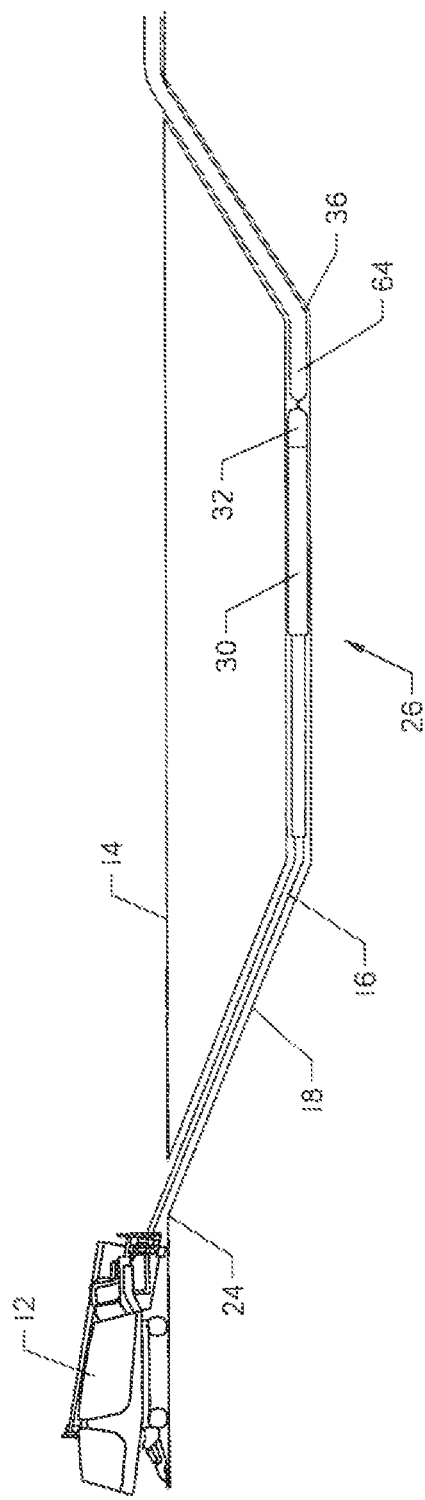
FIG. 8 is an illustration of a new pipe being pulled into the borehole by the horizontal directional drilling system.

Turning to the figures and first to FIG. 1, a horizontal directional drilling system 10 is shown. FIG. 1 shows a drilling machine 12 on a ground surface 14, and a drill string 16 within a borehole 18. The drill string 16 comprises a first end 20 and a second end 22. The first end 20 of the drill string 16 is attached to the drilling machine 12 and enters the ground at an entry access point 24. The second end 22 of the drill string 16 is connected to a downhole tool 26. The downhole tool 26 comprises a beacon or transmitter housing 28, a hammer 30, and a drill bit 32. In operation, the boring machine 12 will send air or fluid through the drill string 16 to the downhole tool 26 to power the hammer 30. The hammer 30 will repeatedly strike a face 34 of the borehole 18 with the drill bit 32 to form the borehole 18. The hammer 30 will keep drilling the borehole 18 with the aid of the boring machine 12 until the hammer reaches a target point 36 (FIG. 8).

Figure 2:
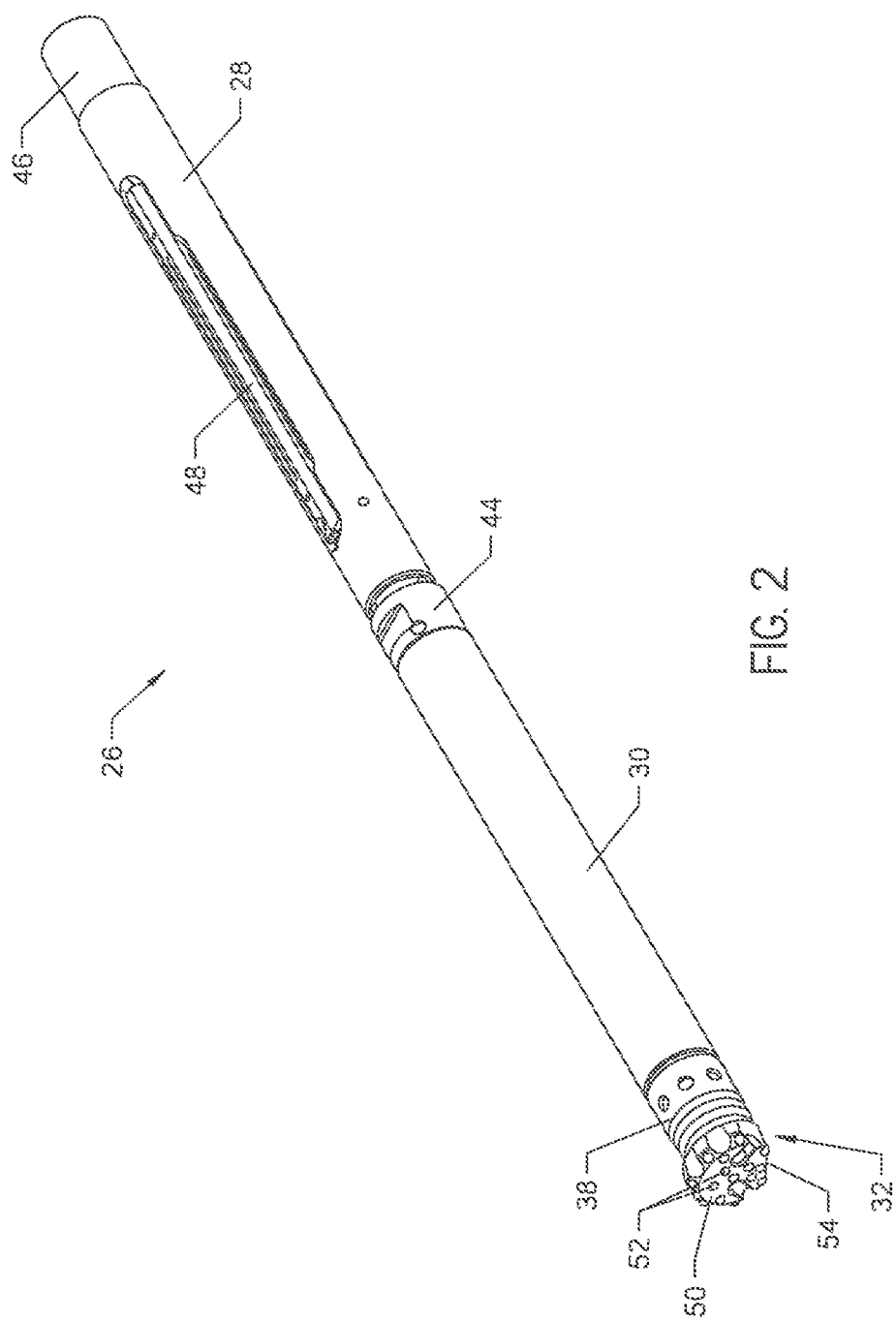
FIG. 2 is a perspective view of the downhole tool comprising the hammer.

Turning now to FIG. 2, the downhole tool 26 is shown in greater detail. The hammer 30 is shown connected to the drill bit 32 via a chuck 38. The chuck 38 typically connects to the drill bit 32 via grooves 40 and splines 42 (FIG. 3) which allow the drill bit to reciprocate within the chuck during boring operations. The chuck 38 connects to the hammer 30 via threads (not shown). However, one of skill in the art will recognize that other forms of connections may be employed as long as the drill bit 32 remains engaged with the hammer 30 during boring operations.

Continuing with FIG. 2, the hammer 30 is shown connected to the housing 28 via a coupler 44. The coupler 44 may connect the housing 28 and the hammer 30 via threads (not shown) or by any means known in the art to secure the hammer 30 to the housing 28. The coupler 44 may connect the housing 28 the hammer 30 at angle to create a bend or offset in the downhole tool 26 to aid in steering underground. The housing 28 further comprises an adapter 46 for connection to the drill string 16 (FIG. 1). The adapter 46 may comprise threads (not shown) for connection to the drill string 16, or it may comprise any means known in the art to secure the housing 28 to the drill string 16 (FIG. 1). Rather than using the coupler 44 to create a bend in the downhole tool 26, the adapter 46 may connect the drill string 16 to the housing 28 at an angle to create the bend or offset in the downhole tool 28 to aid in steering underground. Steering may also be accomplished by using an asymmetrical drill bit. The housing 28 may house a beacon or a transmitter (not shown) used to provide steering information and signal the location of the downhole tool 26 underground. The housing 28 comprises slots to allow the beacon or transmitter signal to pass through the housing. A lid 48 is shown on the housing 28 for removal of the beacon or transmitter when needed.

The drill bit 32, shown in FIG. 2, comprises a cutting face 50. The cutting face 50 comprises a plurality of carbide buttons 52 to help cut through the underground terrain and to help reduce the wear and tear on the cutting face during drilling operations. The cutting face 50 may also comprise an asymmetrical portion 54, as shown in FIG. 2. The asymmetrical portion 54 of the cutting face 50 is used to steer the hammer 30 during boring operations.

Figure 3:
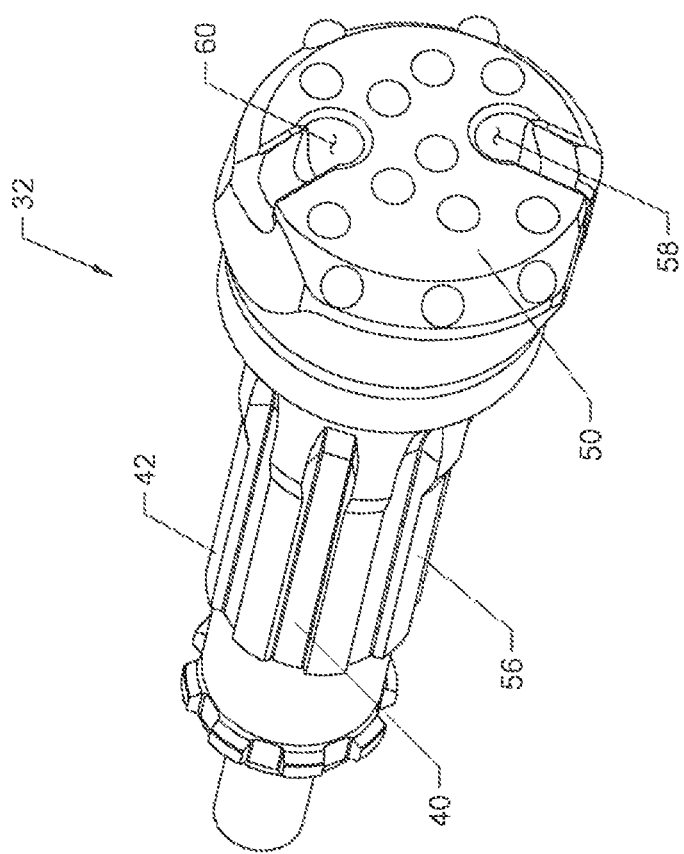
FIG. 3 is a perspective view of a drill hit for use with the hammer shown in FIG. 2.
Figure 7:
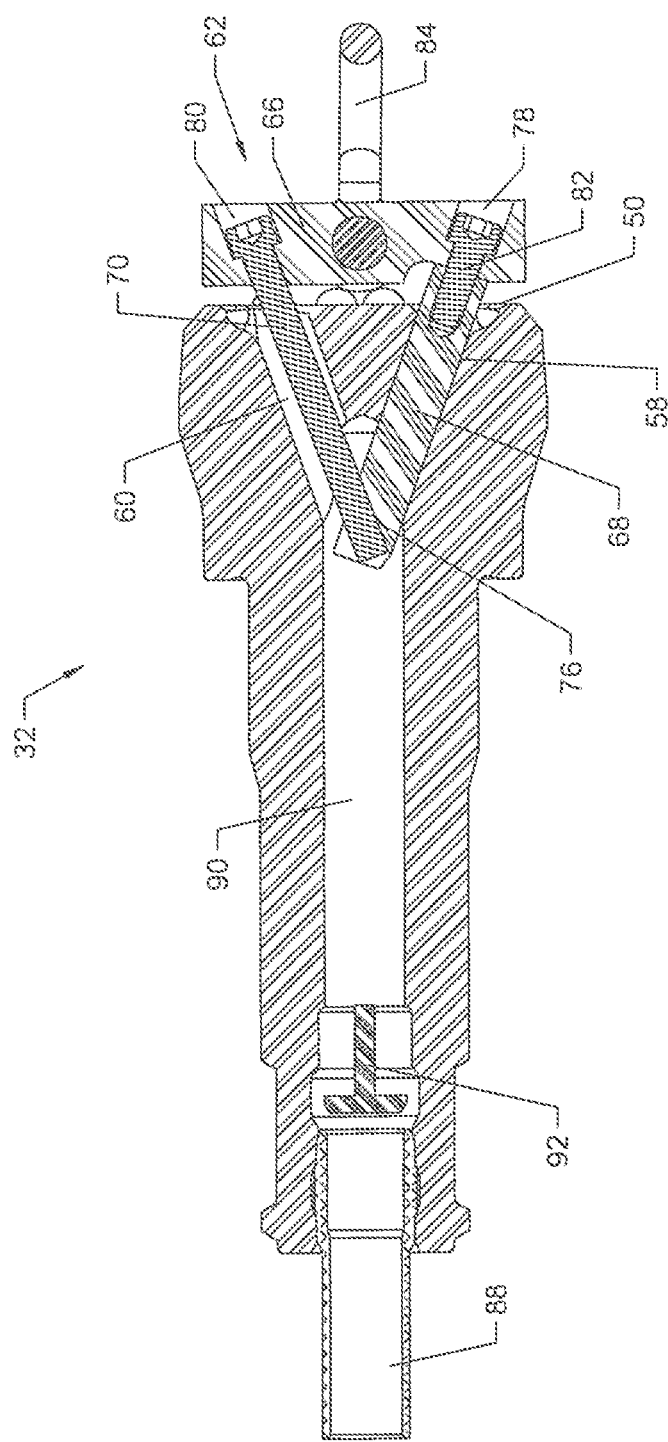
FIG. 7 is a section view along line I-I from FIG. 6 that extends through the center of the drill bit and the pullback adapter.

Turning to FIG. 3, a more detailed view of the drill bit 32 is shown. The drill bit 32 comprises a body 56. The body 56 comprises grooves 40 and splines 42 used for connection to the chuck 38 (FIG. 2.). The cutting face 50 comprises a first passage 58 and a second passage 60 (FIG. 7). An opening of the first passage 58 and an opening of the second passage 60 are shown in FIG. 3.

Figure 4:
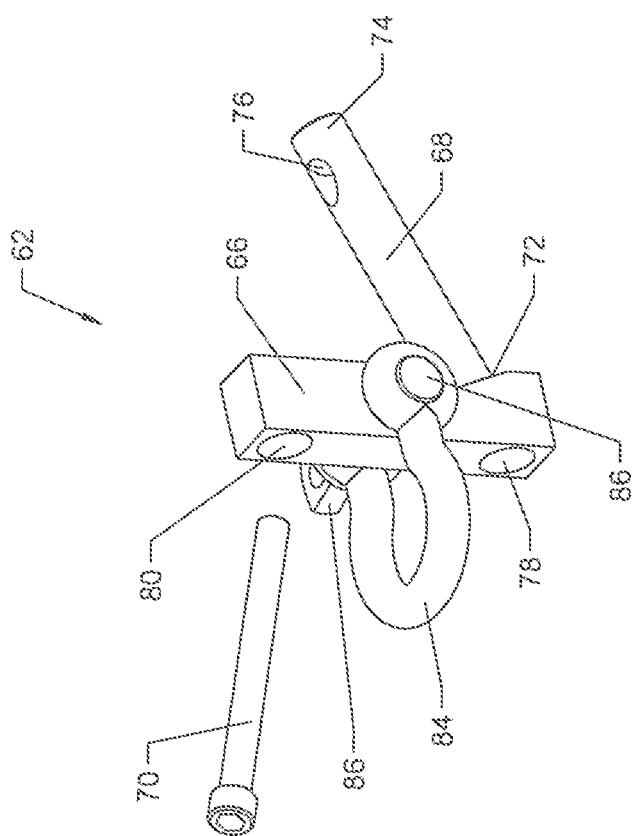
FIG. 4 is a perspective view of a pullback adapter for use with the drill bit of FIG. 3.

Referring now to FIG. 4, a pullback adapter 62 for use with the drill bit 32 (FIG. 3) of the downhole tool 26 (FIG. 2) is shown. One of skill in the art will recognize that the pullback adapter 62 and drill bit 32 described herein may also be used with a downhole tool 26 that does not comprise a hammer 30. In operation, the pullback adapter 62 securely engages with the cutting face 50 of the drill bit 32 (FIG. 3) and serves as a connection point to connect a new pipe 64 to the downhole tool 26, as shown in FIG. 8. The new pipe 64 may then be pulled rearwardly into the borehole 18 using the downhole tool 26 (FIG. 8). The pullback adapter 62, shown in FIG. 4, comprises an attachment member or frame 66, a first member or first leg 68, and a second member or second leg 70. The attachment member 66 may have a length less than the diameter of the cutting face 50 (FIG. 3). The first member 68 comprises a first end 72 and a second end 74. The first end 72 of the first member 68 is attached to the attachment member 66. The second end 74 of the first member 68 comprises a hole 76 for receiving an end of the second member 70. The attachment member 66 further comprises a first hole 78 and a second hole 80. A fastener 82 (FIG. 7) may pass through the first hole 78 of the attachment member 66 at an angle and connect to the first member 68 forming a secure connection between the first member and the attachment member. The fastener 82 may comprise a screw or bolt or other means known in the art to secure the first member 68 to the attachment member 66 (FIG. 7).

Continuing with FIG. 4, the second member 70 may pass through the second hole 80 of the attachment member 66 at an angle allowing the second member to engage with the hole 76 of the first member 68, as shown in FIG. 7. The second member 70 may comprise a bolt or any type of fastener capable of passing through the second hole 80 at an angle and securing with the hole 76. Accordingly, the hole 76 may be threaded or may comprise another means known in the art to secure the second member within the hole of the first member 68. The pullback adapter 62 farther comprises a shackle 84. The shackle 84 may be attached to the attachment member 66 via a fastener 86. The fastener 86 in FIG. 4 comprises a pin, but the fastener may comprise a bolt, screw, or any means known in the art to secure the shackle 84 to the attachment member 66. The shackle 84 serves as the connection point for the new pipe 64 to be pulled back into the borehole 18, as described in more detail with reference to FIG. 8.

Figure 5:
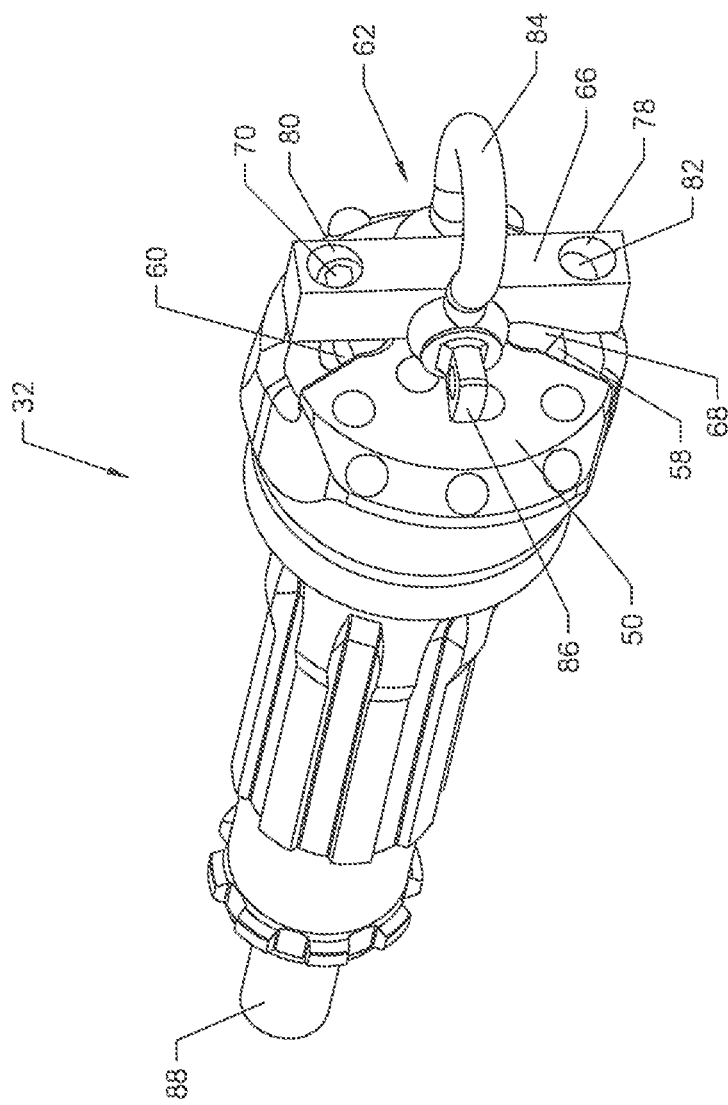
FIG. 5 is a perspective view of the drill bit with the pullback adapter attached to the drill bit.
Figure 6:
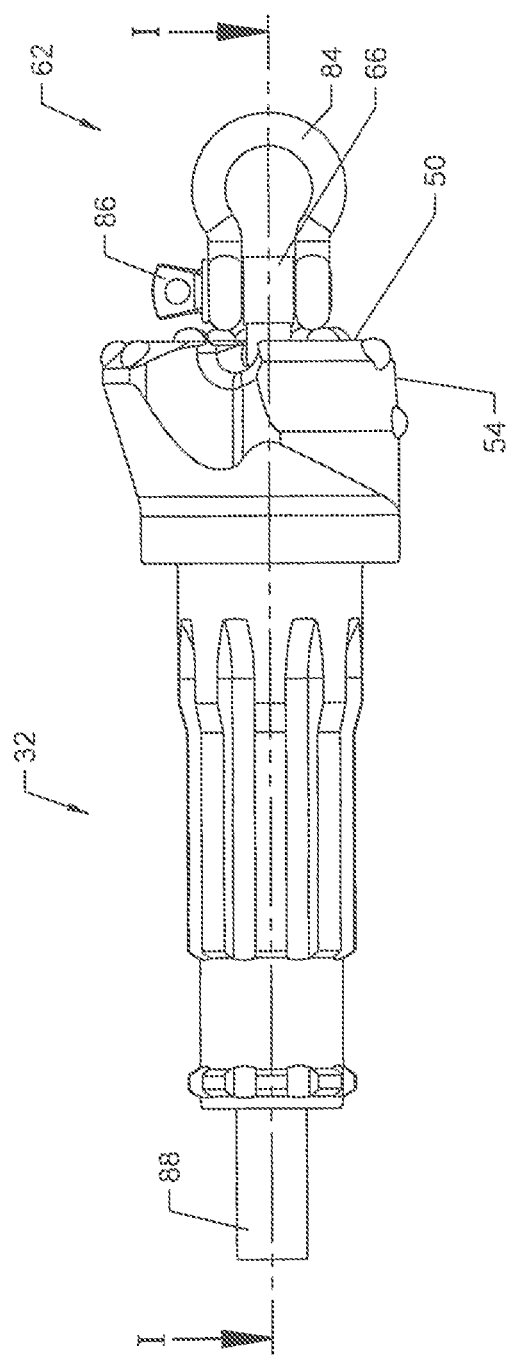
FIG. 6 is a side view of the drill bit and the pullback adapter of FIG. 5.

Turning now to FIGS. 5 and 6, the pullback adapter 62 is shown connected to the cutting face 50 of the drill bit 32. The shackle 84 is shown connected to the attachment member 66 via the fastener 86. FIG. 5 also shows the first member 68 secured to the attachment member 66 and disposed within the first passage 58 of the drill bit 32. The fastener 82 is shown disposed within the first hole 78 of the attachment member 66. FIG. 5 also shows the second member 70 disposed within the second hole 80 of the attachment member 66 and is disposed within the second passage 60 of the drill bit 32. FIG. 6 shows the asymmetrical portion 54 of the cutting face 50 in greater detail. A foot valve 88 is also shown in FIGS. 5 and 6. The foot valve 88 is a component of the drill bit 32 that is used to help make the hammer 30 (FIG. 2) reciprocate in operation.

Referring now to FIG. 7, a section view along line I-I from FIG. 6 is shown. The section view shows an internal cavity 90 contained within the drill bit 32. The internal cavity 90 connects the foot valve 88 to the first and second passages 58 and 60. During boring operations, the first and second passage 58 and 60 serve as exhaust passages for air or drilling fluids. A shuttle valve 92 is also shown in FIG. 7. The shuttle valve 92 shuts off the reverse flow of air or fluids through the foot valve 88 when the hammer 30 (FIG. 2) is turned off or not in use.

Continuing with FIG. 7, the section shows how the pullback adapter 62 connects to the drill bit 32 in greater detail. The first passage 58 and the second passage 60 of the drill bit 32 are shown intersecting the internal cavity 90 at oblique angles. The first member 68 of the pullback adapter 62 may be attached to the attachment member 66 via the fastener 82. The fastener 82 is shown disposed within the first hole 78 of the attachment member 66 at an angle. The first member 68 is shown disposed within the first passage 58 and the internal cavity 90 at an angle. The second member 70 is shown disposed within the second hole 80 of the attachment member 66, the second passage 60, and the internal cavity 90 at an angle. FIG. 7 also shows the second member 70 secured within the hole 76 of the first member 68. The connection of the first member 68 and the second member 70 within the internal cavity 90 of the drill bit 32 and behind the cutting face 50 of the drill bit holds the attachment member 66 against the cutting face such that the pullback adapter 62 moves in concert with the drill bit.

One of skill in the art will recognize that the drill bit 32 may also comprise a third passage (not shown) adapted to receive a third member (not shown) connected to the attachment member 66. In practice, any number of combinations of holes or bolts may be used between the first member 68, the second member 70, and the third member (not shown) within the internal is cavity 90 to secure the attachment member 66 to the cutting face 50 of the drill bit 32.

Turning now to FIG. 8, in operation, the downhole tool 26 comprising the hammer 30 will bore underground until it reaches the target point 36. Once the hammer 30 reaches the target point 36, a minimal amount of excavation will be performed until the drill hit 32 is exposed to the ground surface 14. Only a minimal amount of excavation is required because the downhole tool 26 does not need to be removed from the borehole 18 at the target point 36. Once the drill bit 32 is exposed, the pullback adapter 62 may be secured to the cutting face 50 of the drill bit (FIG. 7).

Referring back to FIG. 7, the following steps are used to secure the pullback adapter 62 to the drill bit 32. The first member 68, being previously secured to the attachment member 66, will be inserted through the first passage 58 in the cutting face 50 at an angle until the first member is disposed within the first passage and the internal cavity 90. The second member 70 will then be passed through the second hole 80 of the attachment member 66 and through the second passage 60 at an angle until it is disposed within the second passage and the internal cavity 90. The second member 70 will then be secured to the first member 68 using hole 76. This may be accomplished by threading the second member 70 into the hole 76 of the first member 68. The first member 68 and the second member 70 will be secured tightly together such that the attachment member 66 is held in place against the cutting face 50 of the drill bit 32 and such that the pullback adapter 62 moves with the drill bit 32.

Turning back to FIG. 8, once the pullback adapter 62 is secured to the drill bit 32, the new pipe 64 may then be attached to the shackle 84 of the pullback adapter 62 (FIG. 7). The boring machine 12, at the entry access point 24, may then start to pull the drill string 16 out of the borehole 18, removing drill pipe sections as they reach the ground surface 14. As the drill string 16 and the downhole tool 26 are pulled rearwardly through the ground, the pullback adapter 62 (FIG. 7) attached to the drill bit 32 pulls the new pipe 64 into the borehole 18, installing the new underground pipe with minimal surface disruption. The downhole tool 26 may then be removed from the borehole 18 at the entry access point 24.

Although the preferred embodiment has been described in detail, it should be understood that various changes, substitutions and alterations can be made therein without departing from the spirit and scope of the invention as defined by the appended claims.

What is claimed is:

1. An assembly comprising:
   a drill bit comprising:
      a body having an internal cavity;
      a cutting face;
      a first opening on the cutting face in fluid communication with the internal cavity such that the first opening and the internal cavity form a continuous conduit; and
      a second opening on the cutting face;
   a pullback adapter that overlays the cutting face comprising:
      a first member disposed in the first opening configured to secure the pullback adapter relative the cutting face; and
      a second member disposed in the second opening configured to secure the pullback adapter relative the cutting face.

2. The assembly of claim 1 wherein the cutting face of the drill bit comprises a steering feature.

3. The assembly of claim 1 wherein the second opening on the cutting face is in fluid communication with the internal cavity such that the second opening and the internal cavity form a second continuous conduit.

4. The assembly of claim 1 wherein the first member and the second member are not parallel.

5. The assembly of claim 1 wherein the body has a longitudinal axis.

6. The assembly of claim 5 wherein the pullback adapter comprises a structural element that overlays the cutting face such that it is perpendicular to the longitudinal axis of the body.

7. The assembly of claim 1 wherein the pullback adapter further comprises a shackle.

8. The assembly of claim 1 wherein the pullback adapter comprises a first opening and a second opening.

9. The assembly of claim 8 wherein the first member and the second member are disposed through the first opening and the second opening of the pullback adapter.

10. A system comprising:
a drilling machine;
a drill string comprising a first end and a second end; and
wherein the first end of the drill string is attached to the drilling machine and the second end of the drill string comprises a hammer and the assembly of claim 1.

11. An assembly comprising:
a drill bit comprising:
a body having a longitudinal axis; and
a cutting face;
a pullback adapter comprising:
a structural element that is perpendicular to the longitudinal axis of the body;
a first member to secure the pullback adapter relative the cutting face; and
a second member to secure the pullback adapter relative the cutting face that is not parallel to the first member.

12. The assembly of claim 11 wherein the cutting face of the drill bit comprises a steering feature.

13. The assembly of claim 11 wherein the body comprises an internal cavity.

14. The assembly of claim 13 wherein the cutting face further comprises a first passage and a second passage that are in fluid communication with the internal cavity.

15. The assembly of claim 11 wherein the pullback adapter further comprises a shackle.

16. The assembly of claim 11 wherein the structural element of the pullback adapter overlays the cutting face.

17. A system comprising:
a drilling machine;
a drill string comprising a first end and a second end; and
wherein the first end of the drill string is attached to the drilling machine and the second end of the drill string comprises a hammer and the assembly of claim 11.

18. An assembly comprising:
a drill bit comprising:
a body;
a cutting face disposed on the body;
a first passage having a first opening on the cutting face;
a second passage that is not parallel to the first passage having a second opening on the cutting face; and
a pullback adapter comprising;
a first fastener disposed within the first opening configured to secure the pullback adapter relative the cutting face; and
a second fastener disposed within the second opening configured to secure the pullback adapter relative the cutting face.

19. The assembly of claim 18 wherein the first fastener and the second fastener are not parallel.

20. The assembly of claim 18 wherein the pullback adapter further comprises a shackle.

* * * * *

UNITED STATES PATENT AND TRADEMARK OFFICE
CERTIFICATE OF CORRECTION

PATENT NO. : 9,611,696 B2
APPLICATION NO. : 14/865416
DATED : April 4, 2017
INVENTOR(S) : Crane et al.

Page 1 of 1

It is certified that error appears in the above-identified patent and that said Letters Patent is hereby corrected as shown below:

In the Specification

Column 2, Line 36, please delete "hit" and substitute therefore --bit--.

Column 4, Line 56, please delete "farther" and substitute therefore --further--.

Column 5, Line 48, please delete "is".

Column 5, Line 54, please delete "hit" and substitute therefore --bit--.

Signed and Sealed this
Twenty-third Day of May, 2017

Michelle K. Lee
*Director of the United States Patent and Trademark Office*